No Printed Specification Available
7164X
T. Boynton.
Stamp Color Printing.
Nº
Patented Jul. 12. 1832.
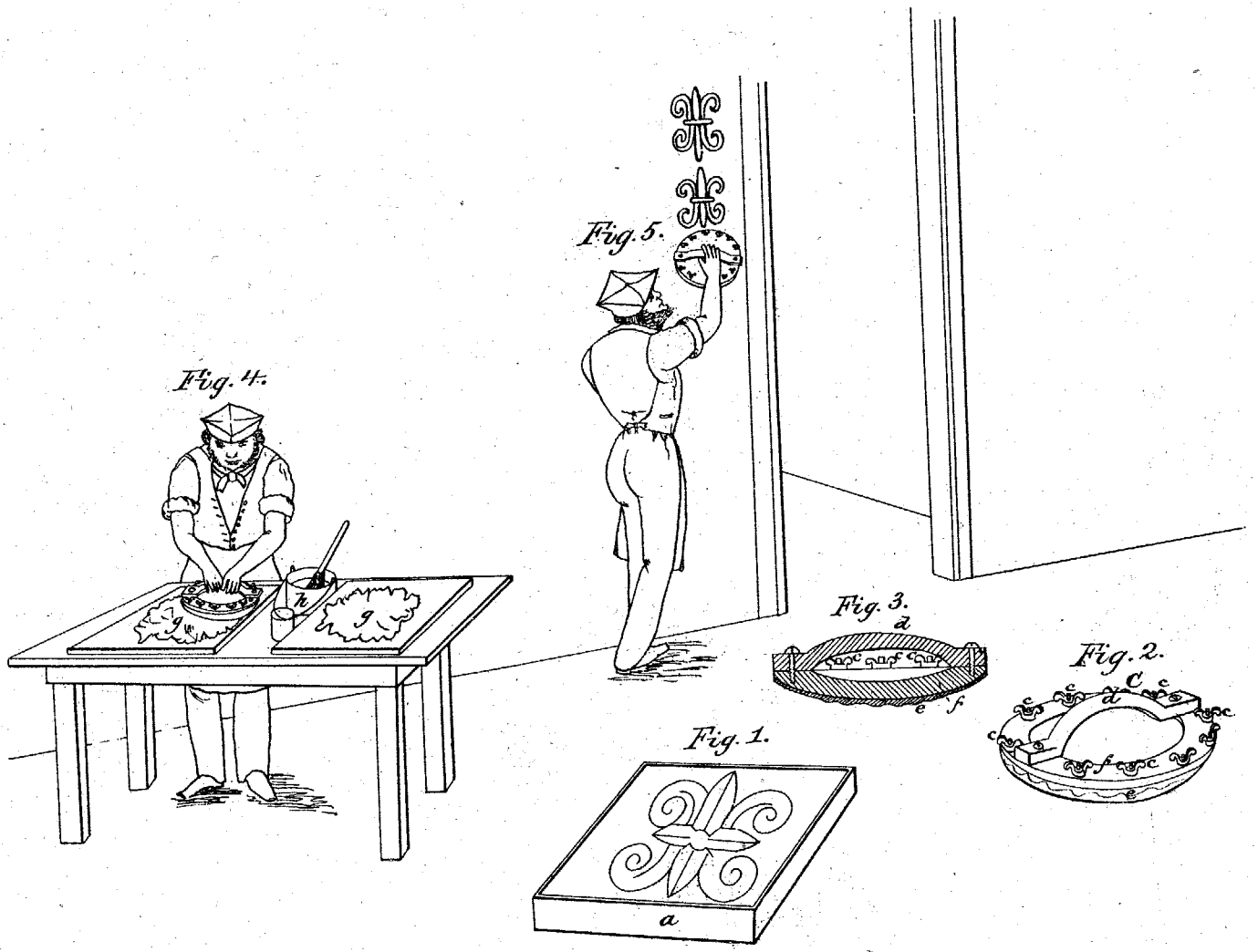

7164X July 12, 1832

Thomas Boynton. Windsor, Vermont.

Letters Patent.

The Schedule referred to in these Letters Patent and making part of the same, containing a description in the words of the said Thomas Boynton himself of his improvement in the mode of ornamenting the walls & floors of rooms & various other things, called Elastic Stamp Painting.

To all persons to whom these presents shall come.
Thomas Boynton of Windsor, County of Windsor & State of Vermont sends Greeting.— Be it known that I the aforesaid Thomas Boynton have discovered invented & applied to use, A new and useful Art, for the purpose of ornamenting the walls & floors of rooms and various other things called. Elastic Stamp painting. Specified in the words following to wit—

1st make one or more moulds, by carving, engraving, or forming any desired ornament on a flat surface of wood, Stone Metal or other material of the size you want your ornament, by indenting it so as to sink or raise, the ornament, as may be most convenient from one eighth to one fourth of an inch, and around the edge of the mould raise a line, about three fourths of an inch high & give it a coat or two of Varnish to keep it smooth. Moulds made as above may be used to cast the composition stamps in— or they may be used for patterns, to cast Metal moulds in sand. 2nd ~~make a composition~~ of Glue and Molasses such as printers use for making Ink Rollers when this is moderately hot pour it into the moulds (after they have been carefully oiled to prevent sticking) about half an inch thick, and keep them level & still, till cold, then take the stamps from the moulds. 3rd prepare some circular Blocks of wood to glue the composition stamps on. these should be made of boards or plank according as they are wanted, more or less circular— they should 71 64X should be made hollow on one side and rounding on the other
and about three fourths of an inch thick, being a segment of a
cylinder. — These blocks should be of a size to suit the stamps —
About nine inches is a medium size, but they may be more or
less, either square or oblong.... on the hollow side [illegible] put
a handle & on the rounding face glue the composition stamps,
put some very small thumb screws thro' the edges, & turn them
till their ends are even with the surface of the stamp, to
prevent their being pressed on too hard when used. — Give them
a coat or two of paint to prevent their drying too hard, and
they are fit for use.... 4th To make plain ornaments pre-
pare a board smooth & level, called a pallet board, large
enough to impress your stamps upon. lay this on a bench or table
& on this lay a thick coat of paint with a brush. then take it
off with your stamp, by pressing every part gently on the board
with a rolling motion, and apply it to the wall, floor or other
work, with the same motion alternately having previously
laid a ground work in dead colours with a brush.
5th To make variegated ornaments, several methods are
practised, viz, put two or more colours on different parts of
a smooth pallet board, and take them on your stamp with one
impression and apply it to the wall or other work. — or make
two or more indented Pallet boards, to match in such a man-
ner, that the raised part of one shall correspond to the
indented part of the other, so that by putting different colours
on each board & pressing your stamp on first one, & then
the other by a guide at one side, and then applying it to the
Wall &c. Stripes, flowers &c. of various colours may be pro-
duced; — or stamps may be made with parts of figures
to match, so that by using them with different colours
on smooth pallet boards, variegated figures are pro-
duced. These different methods are chosen according
to the nature of the ornaments.... 6th Walls, floors &c.
may

7164X may be ornamented with elastic stamps, by applying the
same stamp successively or by using a variety of stamps in
any manner your taste may dictate.

In testimony that the above is a true specification
of my said invention as above described, I have hereto
set my hand this twenty sixth day of June Anno Domini
one thousand eight hundred and thirty two.

Witnesses
Thomas Leland }
John T. Everett }

Thomas Boynton (840
M.G.L.

546 [illegible]